Feb. 11, 1941. J. H. MIRON 2,231,279
STRIP WINDING MECHANISM
Filed April 24, 1939 2 Sheets-Sheet 1
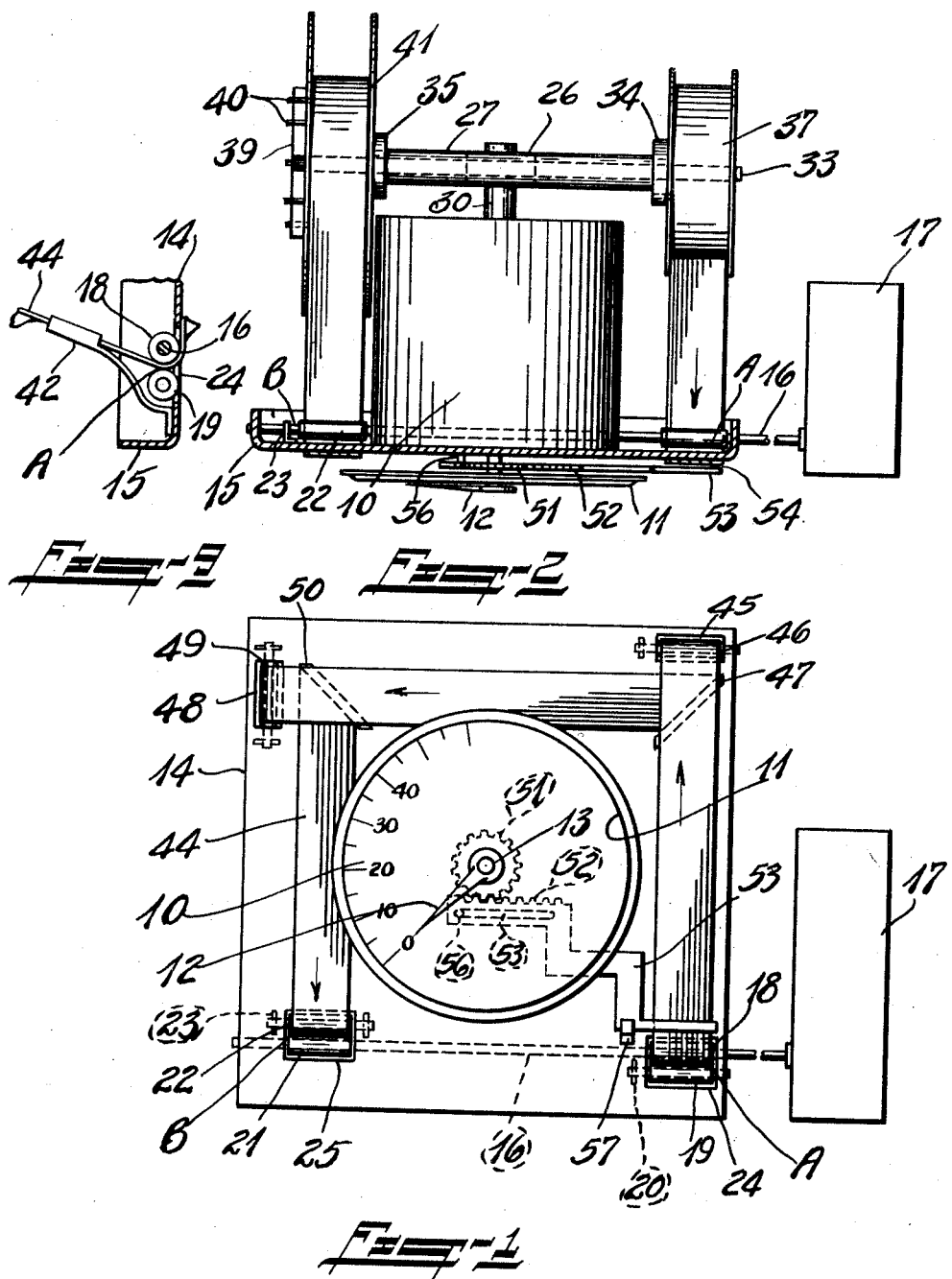
INVENTOR
Joseph H. Miron.
BY
Frank C. Fearman
ATTORNEY Feb. 11, 1941.  J. H. MIRON  2,231,279
STRIP WINDING MECHANISM
Filed April 24, 1939   2 Sheets-Sheet 2
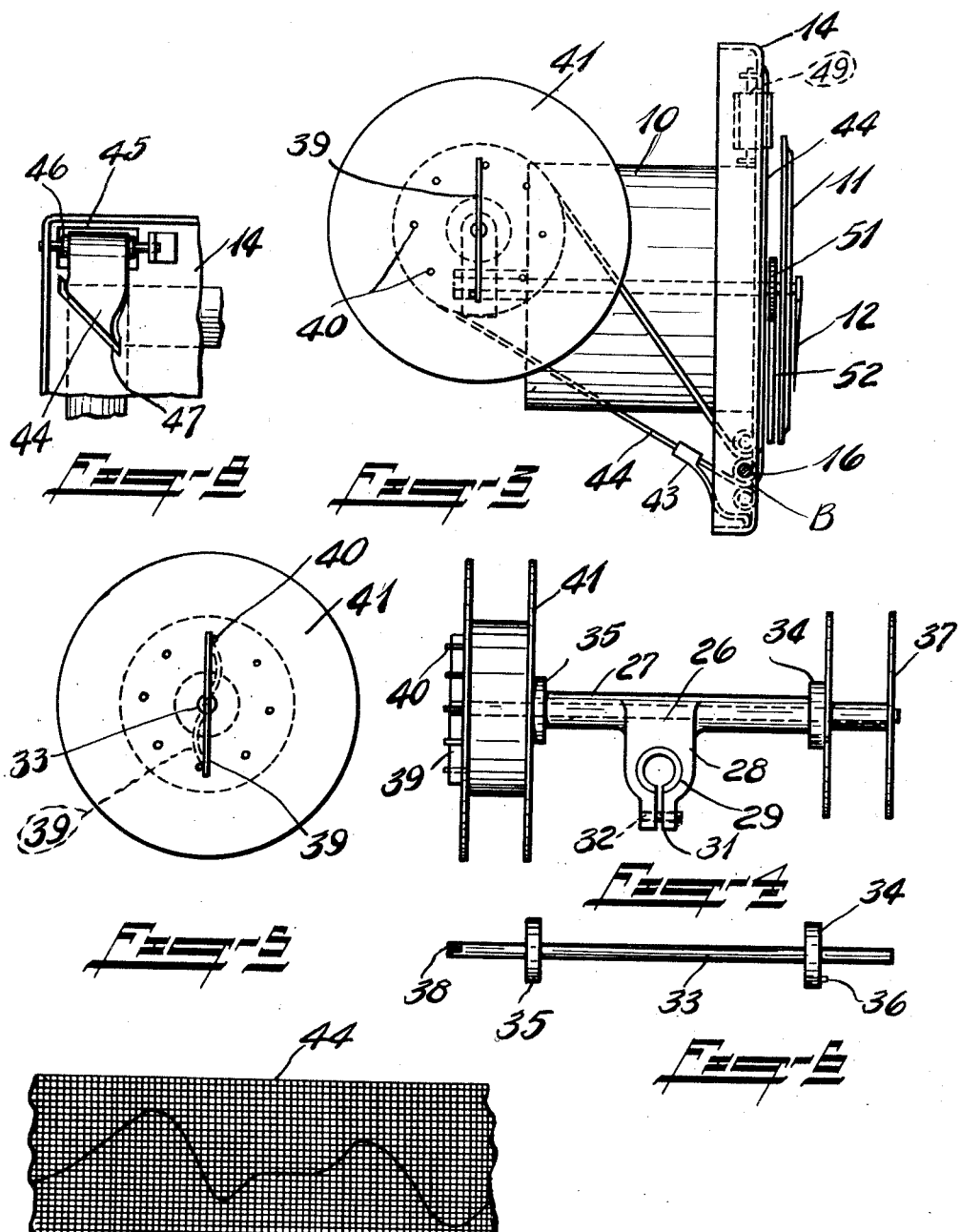
INVENTOR
Joseph H. Miron.
BY Frank C. Scarman
ATTORNEY Patented Feb. 11, 1941

2,231,279

UNITED STATES PATENT OFFICE 2,231,279

STRIP WINDING MECHANISM

Joseph H. Miron, Flint, Mich.

Application April 24, 1939, Serial No. 269,561

6 Claims. (Cl. 242—55)

This invention relates to strip feeding mechanism operable in combination with the speedometer of automotive vehicles, and is in part a continuation of my abandoned application, Serial No. 117,759, filed December 28, 1936.

One of the prime objects of the invention is to provide means associated with the speedometer of a vehicle and driven by means of a clock or other suitable device to permit positively, accurately and permanently recording of the speed and/or speeds at which the vehicle has traveled, the time, as well as the time or number of times it has been parked or stationary, and the time for each stop.

A further object is to provide very simple, practical and inexpensive mechanism, which can be applied to old vehicles already in use, or in-built in new vehicles, which can be readily installed, which cannot be tampered with, and on which speed, stops, etc. can be recorded to serve as positive proof of the driver's speed, stops and the time thereof.

A further object still is to provide a strip feeding mechanism on which the vehicle speed, stops, miles, and time can be recorded to serve as a silent, but positive witness, as to speed, stops and the time thereof, which will enable fleet owners to check the driving of the vehicle operators, which will be of valuable assistance to officials interested in the enforcement of speed laws, and which will serve to deter drivers from speeding, knowing that an accurate record will be made, and which cannot be refuted.

With the above and other objects in view, the present invention consists in the combination and arrangement of parts, hereinafter more fully described, illustrated in the accompanying drawings, and more specifically pointed out in the appended claims, it being understood that changes may be made in the form, size, proportion and minor details of construction, without departing from the spirit, or sacrificing any of the advantages of the invention.

In the drawings:

Fig. 1 is a front view of an automotive vehicle speedometer with the glass face removed and showing a clock and flexible record strip associated therewith, the arrows indicating the direction of travel of the strip.

Fig. 2 is a top plan view with the plate support shown in section.

Fig. 3 is a side elevational view with the clock omitted.

Fig. 4 is an enlarged assembly of the spools and spool mounting.

Fig. 5 is an end view thereof, the broken lines showing the resilient driving strip flexed to release when necessary.

Fig. 6 is a detail of the spool shaft and flanges.

Fig. 7 is an enlarged fragmentary view of the recording strip.

Fig. 8 is a fragmentary rear view of the plate support, illustrating the guide roller and windable strip.

Fig. 9 is also a fragmentary sectional edge view of the plate support showing one of the roller assemblies, strip guide, and windable strip.

Where concerns, firms and individuals operate fleets of trucks, it is very desirable to know the speed at which the operator drives, the number of stops made, the time the stops occur, and the period of time covered by each stop. At present there is no known method by which this can be accomplished, and I have, therefore, perfected a simple, practical mechanism by which this information can be recorded and preserved, and which will be of vast assistance to car owners, officers of the law, and others who find it necessary to know and prove the time and rate of speed of a vehicle, when it was parked and stationary, and the time parked.

Referring now more specifically to the drawings in which I have shown the preferred embodiment of my invention, the numeral 10 indicates a conventional speedometer such as is used in automotive vehicles at present, this includes a suitably graduated dial 11, and a needle 12 which is fixed on the speedometer shaft 13 as usual for indicating the speed the vehicle is traveling.

The recording means is preferably mounted directly back of the graduated dial and comprises a plate support 14, which can be secured to the speedometer case 10 in any desired manner, this plate being flanged as at 15, and a horizontally disposed shaft 16 is journaled in said flanges, the one end projecting outwardly and being connected to a conventional clock 17 which can be mounted on a vehicle instrument panel in any desired manner, said clock being coupled to and serving to drive said shaft.

A preferably rubberized roller member 18 is mounted on the shaft 16 at a point directly adjacent one edge of the plate 14, and a similar roller 19 is journaled in bearings 20 at a point directly below the roller 18, so that these rollers are disposed in rolling contact and form a roller assembly A, which will be hereinafter referred to.

A similar roller assembly B is provided on the opposite edge of the plate, the roller 21 being mounted on the shaft 16, and the companion roller 22 is journaled in bearings 23 and has rolling contact with the roller 21, slotted openings 24 and 25 respectively being provided in said plate in alignment with these roller assemblies, and for a purpose to be presently described.

A spool support and assembly 26 is mounted on the inner end of the speedometer, and comprises a hollow tubular sleeve 27 provided with a depending bearing 28 formed integral with the sleeve and bored as at 29 to accommodate the speedometer extension sleeve 30, the flange 31 being split as shown, and set screw 32 is provided so that the assembly can be clamped in position on the extension sleeve.

A spool shaft 33 is mounted in the sleeve 27, and flanges 34 and 35 respectively are provided thereon, a pin 36 being provided on one of said flanges and is adapted to engage a suitable opening (not shown) provided in one of the flanges of the spool 37, one end of this shaft being slotted as at 38 to accommodate a transversely disposed, flexible driving member 39, which engages one pair of a plurality of oppositely disposed pins 40 provided in the outer flange of the spool 41, thus providing a drive for said spool as the shaft is driven.

I wish to direct particular attention to the fact that the inner diameter of the spool 41 is equal to the outer diameter of the rolled recording strip when it is wound on the spool 37, thus when the record strip begins to wind on the spool 41, the R. P. M. of the two spools will be approximately equal, then as the winding progresses, the R. P. M. of the spool 37 will exceed the R. P. M. of the spool 41 and this difference will be taken care of by the slippage of the driving member 39.

Strip guides 42 and 43 respectively are provided directly adjacent the roller assemblies A and B, and a windable record strip 44 is wound on the spool 37, said strip leading through the guide 42 which is mounted on the plate, thence the strip travels between the rollers 18 and 19, thence leading upwardly and through a slot 45 provided in the face of the plate 14, thence over a horizontally disposed roller 46 journaled on the back of the plate, and thence through an angularly disposed slot 47, leading thence horizontally across the face of the plate, thence through the vertically disposed slot 48, thence over the vertically disposed roller 49, and through the angularly disposed slot 50, and thence downwardly through the slot 25 between the rollers 21 and 22, thence through the guide 43, and thence being wound on the rewind spool 41 provided on the end of the shaft 33.

The clock 17 drives the roller assemblies A and B, and thus furnishes the feed for the record strip, and it can be connected to and driven from the vehicle battery so that no winding is required.

The registering mechanism is mounted directly on the speedometer shaft and comprises a spur gear 51, which is mounted on the shaft 13, said gear meshing with the rack 52 provided on an offset leg 53, a pen or pencil 54 being mounted on the end of said leg with its point in contact with the face of the record strip, so that a line is produced as the strip is fed. A horizontal slot 55 is provided in the leg 53, and a pin 56 is mounted in the plate 14, the end projecting beyond the face thereof, and extending into the slot 55, so that the rack is held in engagement with the gear, a guide bearing 57 is secured to the face of the plate support 14 and the lower end of the leg is mounted to slide therein so as to prevent tilting and hold the leg in proper position, the pin 56 can, of course, be roller bushed to minimize friction and wear, and it will be obvious that as the speedometer shaft is driven that the leg with the recording pen or pencil thereon will be actuated accordingly, and will "log" the trip, stops, etc., on the strip as it travels over said plate and is fed by the clock.

As the clock mechanism feeds the paper across the face of the plate 14, the strip is unwound from the spool 37, and as this spool is pinned to the flange 34, it will be obvious that the shaft 33 will be driven accordingly, and that the rewind spool 41 will also be driven through instrumentally of the flexible member 39, engaging the pins 40 provided on the spool flange, and whenever the pull on the strip is sufficient to flex the member 39, as shown in broken lines in Fig. 5 of the drawings, this member will snap over the pins 40 permitting the shaft to make a full revolution without turning the spool, thus compensating for any differences in diameters of the rolled strip.

The strip feeds continuously so long as the clock operates, and the recording pen or pencil is actuated by the speedometer shaft so that an absolutely true and accurate record or "log" is made, there can be no mistakes or omissions, and the record will serve as absolute proof as to time, speed, and stops for every minute of the day.

From the foregoing description, it will be obvious that I have perfected a very simple, practical and economical recording mechanism for automotive vehicles and the like.

What I claim is:

1. A winding mechanism of the class described and comprising a supporting structure, a sleeve mounted thereon, a shaft journaled in said sleeve, a drum mounted on and drivingly connected to one end of said shaft for driving said shaft when the drum is rotated, a rewind spool revolvably mounted on the opposite end of the shaft, a flexible winding strip wound on said drum and arranged to travel across the face of said support and to be wound on said rewind spool when the shaft is driven, driven means engageable with said strip for unwinding it from said drum and driving said shaft, and flexible means on said shaft and engageable with said rewind spool for driving said rewind spool as the shaft is driven, said flexible means also automatically releasing said spool when the diameter of the wound strip on the rewind spool exceeds the diameter of the wound strip on the drum and creates a predetermined drag on said rewind spool.

2. A winding mechanism of the character described and comprising a supporting structure, a sleeve mounted thereon, a shaft journaled in said sleeve with its ends projecting beyond the ends thereof, a drum mounted on and drivingly secured in one projecting end of the shaft, a rewind spool revolvably mounted on the opposite projecting end, a flexible winding strip wound on said drum and arranged to travel in a predetermined path across the face of the support and to be rewound on the rewind spool, driven means engageable with said strip for unwinding said strip from said drum and driving said shaft, and means on said shaft and engageable with said spool for driving said rewind spool when the shaft is driven, said last named means being automatically releasable when the rewind spool tends to wind faster than the speed of travel of the strip feeding means.

3. A winding mechanism of the character described and comprising a supporting structure, a sleeve mounted thereon, a shaft journaled in said sleeve, a drum mounted on and drivingly secured on one end of said shaft, a rewind spool revolvably mounted on the opposite end of the shaft and provided with a winding surface of greater diameter than the winding surface of the drum, a flexible winding strip wound on said drum, driven strip feeding roller assemblies mounted on the support and engageable with said strip, and resilient means on said shaft and engageable with said rewind spool for driving said spool as the shaft is driven, said resilient means being automatically releasable when the rewind spool tends to wind faster than the speed of travel of the strip feeding means.

4. A winding mechanism of the class described and comprising a support, a sleeve mounted thereon, a transversely disposed shaft journaled in said sleeve, a drum mounted on and drivingly secured on one end of said shaft beyond the sleeve, a rewind spool revolvably mounted on the opposite end of said shaft, a flexible winding strip wound on said drum and arranged to travel across the face of the support, driven roller assemblies adjacent said drum and engaging said strip for unwinding it from the drum and driving said shaft, and means on the end of the transversely disposed shaft and having releasable engagement with the rewind spool for driving said spool and rewinding said strip as it is unwound from the drum.

5. A winding mechanism of the class described and comprising a support, a sleeve, a transversely disposed shaft journaled therein, a drum drivingly and removably secured on one end of the shaft and on which a flexible strip is wound, a rewind spool revolvably mounted on the opposite end of the shaft beyond the end of the sleeve, and on which the strip is wound as it is unwound from the drum, driven means engageable with said strip for unwinding it from the drum to drive said shaft and feed the strip across the face of the support, and a flexible clutch mounted on the end of the transversely disposed shaft and engageable with said rewind spool for automatically releasing said rewinding spool when the diameter of the wound strip on the rewind spool exceeds the diameter of the wound strip on the drum and creates a drag on said spool.

6. A winding mechanism of the class described and comprising a flat support provided with driven cooperating rollers mounted thereon in pairs, a transversely disposed shaft, a sleeve forming a bearing for said shaft, a winding drum driving and removably secured on one end of said shaft, a flexible strip wound on said drum, a rewind spool mounted on the opposite end of the shaft, said strip traveling between said rollers and being attached to said rewind spool, means for driving certain of said rollers to unwind said strip from said drum and drive said shaft, and means for driving said rewind spool, said spool driving means including a resilient member mounted on the one end of the shaft and engageable with the spool, and being automatically releasable when the diameter of the wound strip on the rewind spool exceeds the diameter of the wound strip on the drum and creates a predetermined drag on said rewind spool.

JOSEPH H. MIRON.